United States Patent

Bendicks

(10) Patent No.: US 9,272,631 B2
(45) Date of Patent: Mar. 1, 2016

(54) METHOD AND CHARGING STATION FOR TRACTION BATTERY OF AN ELECTRIC VEHICLE WITH AUTOMATIC, MOTORIZED POSITIONING OF STATION-SIDE COUPLER TO INDUCTIVELY CHARGE THROUGH THE VEHICLE LICENSE PLATE

(71) Applicant: Leopold Kostal GmbH & Co., Luedenscheid (DE)

(72) Inventor: Norbert Bendicks, Schalksmuehle (DE)

(73) Assignee: Leopold Kostal GmbH & Co. KG, Luedenscheid (DE)

( * ) Notice: Subject to any disclaimer, the term of this patent is extended or adjusted under 35 U.S.C. 154(b) by 152 days.

(21) Appl. No.: 14/135,741

(22) Filed: Dec. 20, 2013

(65) Prior Publication Data

US 2014/0111155 A1 Apr. 24, 2014

Related U.S. Application Data

(63) Continuation-in-part of application No. PCT/EP2012/065371, filed on Aug. 6, 2012.

(30) Foreign Application Priority Data

Aug. 9, 2011 (DE) .......................... 10 2011 109 834

(51) Int. Cl.
*H02J 7/02* (2006.01)
*B60L 11/18* (2006.01)

(52) U.S. Cl.
CPC ........... *B60L 11/182* (2013.01); *B60L 11/1829* (2013.01); *B60L 11/1833* (2013.01);
(Continued)

(58) Field of Classification Search
CPC .............. B60L 11/182; B60L 11/1829; B60L 11/1833; B60L 11/1835
USPC ................................... 320/108, 109; 307/104
See application file for complete search history.

(56) References Cited

U.S. PATENT DOCUMENTS 4,496,896 A * 1/1985 Melocik ................... B60K 1/04
 320/108
4,782,342 A * 11/1988 Walton ............... G06K 7/10316
 235/380

(Continued)

FOREIGN PATENT DOCUMENTS

DE 2434890 B1 * 11/1975 ............ B60L 11/182
DE 202009010275 U1 10/2009
(Continued)

OTHER PUBLICATIONS

The Ink Tub, Published Jan. 6, 2008, Accessed online Jun. 8, 2015, http://www.shedpress.com/theinktub/?p=48.*

(Continued)

*Primary Examiner* — Drew A Dunn
*Assistant Examiner* — John Trischler
(74) *Attorney, Agent, or Firm* — Brooks Kushman P.C.

(57) ABSTRACT

A charging station for charging a vehicle includes a charger, a camera, a positioner, and a controller. The charger has a transformer part by which electrical energy can be transferred to a corresponding transformer part arranged behind the vehicle license plate when the charger is in a position relative to the license plate at which the transformer parts sandwich the license plate. The camera generates positional information indicative of positioning between the charger and the license plate. The positioner can move the charger within a range of motion. When the license plate is within the range of motion, the positioner moves the charger based on the positional information to the position at which the transformer parts sandwich the license plate. The controller uses the positional information to generate instructions indicative on how to drive the vehicle to a position in which the license plate is within the range of motion.

8 Claims, 2 Drawing Sheets

(52) U.S. Cl.
CPC ............. *B60L11/1835* (2013.01); *H02J 7/025* (2013.01); *B60L 2250/10* (2013.01); *B60L 2250/16* (2013.01); *B60L 2260/32* (2013.01); *Y02T 10/7005* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | | |
|---|---|---|---|---|
| 4,952,937 | A * | 8/1990 | Allen | G01S 7/022 342/20 |
| 5,341,083 | A * | 8/1994 | Klontz | B60L 11/1816 320/109 |
| 5,462,439 | A * | 10/1995 | Keith | B60L 1/08 180/279 |
| 5,498,948 | A * | 3/1996 | Bruni | B60L 11/1816 320/108 |
| 5,523,666 | A * | 6/1996 | Hoelzl | B60K 1/04 320/109 |
| 5,539,296 | A * | 7/1996 | Ito | B60L 11/182 320/108 |
| 5,565,755 | A * | 10/1996 | Keith | B60L 1/08 219/202 |
| 5,572,109 | A * | 11/1996 | Keith | B60L 1/08 180/279 |
| 5,598,084 | A * | 1/1997 | Keith | B60L 1/08 235/382 |
| 5,696,367 | A * | 12/1997 | Keith | B60L 1/08 235/380 |
| 5,710,502 | A * | 1/1998 | Poumey | B60L 11/182 320/108 |
| 5,821,731 | A * | 10/1998 | Kuki | B60L 11/1805 320/108 |
| 6,087,806 | A * | 7/2000 | Fujioka | B60L 11/1816 320/109 |
| 6,157,162 | A * | 12/2000 | Hayashi | B60L 11/1818 320/104 |
| 6,535,116 | B1 * | 3/2003 | Zhou | B60C 23/009 340/438 |
| 7,031,805 | B2 * | 4/2006 | Lee | B60L 11/1833 700/245 |
| 7,813,855 | B2 * | 10/2010 | Watanabe | B62D 15/0285 180/204 |
| 7,999,506 | B1 * | 8/2011 | Hollar | B60L 11/1818 320/104 |
| 8,169,340 | B2 * | 5/2012 | Oyobe | B60L 11/123 320/106 |
| 8,375,655 | B1 * | 2/2013 | Welschholz | B60L 11/182 52/173.3 |
| 8,489,315 | B2 * | 7/2013 | Yamamoto | B60L 3/0046 320/108 |
| 8,508,186 | B2 * | 8/2013 | Morita | B60L 11/182 320/108 |
| 8,513,915 | B2 * | 8/2013 | Patel | B60L 11/182 320/108 |
| 8,772,960 | B2 * | 7/2014 | Yoshida | B60L 11/182 307/104 |
| 8,798,829 | B2 * | 8/2014 | Ichikawa | B60L 11/182 307/104 |
| 2008/0042848 | A1 * | 2/2008 | Roberts | B60R 13/10 340/572.7 |
| 2009/0040068 | A1 * | 2/2009 | Oyobe | B60L 11/123 340/932.2 |
| 2010/0017249 | A1 * | 1/2010 | Fincham | B60L 3/12 705/412 |
| 2010/0106372 | A1 * | 4/2010 | Watanabe | B62D 15/0285 701/41 |
| 2010/0201309 | A1 * | 8/2010 | Meek | B60L 11/1816 320/108 |
| 2010/0213894 | A1 * | 8/2010 | Sip | B60L 11/1829 320/108 |
| 2010/0235006 | A1 * | 9/2010 | Brown | B60L 11/182 700/286 |
| 2010/0241470 | A1 * | 9/2010 | Smith | G06Q 10/087 429/61 |
| 2010/0277121 | A1 * | 11/2010 | Hall | B60L 11/182 320/108 |
| 2011/0025267 | A1 * | 2/2011 | Kamen | B60L 8/003 320/109 |
| 2011/0109267 | A1 * | 5/2011 | Morita | B60L 11/182 320/109 |
| 2011/0148350 | A1 * | 6/2011 | Wegener | B60L 11/182 320/108 |
| 2011/0254503 | A1 * | 10/2011 | Widmer | B60L 11/182 320/108 |
| 2012/0098483 | A1 * | 4/2012 | Patel | B60L 11/182 320/108 |
| 2012/0280652 | A1 * | 11/2012 | Welschholz | B60L 11/182 320/108 |
| 2012/0319644 | A1 * | 12/2012 | Hu | B60L 11/182 320/108 |
| 2013/0038272 | A1 * | 2/2013 | Sagata | B60L 11/182 320/106 |
| 2013/0042542 | A1 * | 2/2013 | Welschholz | B60L 11/182 52/73 |
| 2013/0049687 | A1 * | 2/2013 | Hershey | H02J 7/0042 320/109 |
| 2013/0335015 | A1 * | 12/2013 | Ichikawa | H02J 7/025 320/108 |
| 2014/0039728 | A1 * | 2/2014 | Imazu | B60L 11/182 701/2 |
| 2014/0111155 | A1 * | 4/2014 | Bendicks | B60L 11/182 320/108 |
| 2014/0240076 | A1 * | 8/2014 | Elias | B60L 11/182 336/221 |
| 2014/0253278 | A1 * | 9/2014 | Elias | B60L 11/182 336/221 |
| 2014/0292542 | A1 * | 10/2014 | Bruning | B62D 15/027 340/932.2 |
| 2015/0061593 | A1 * | 3/2015 | Wechlin | B60L 11/182 320/109 |

FOREIGN PATENT DOCUMENTS

| | | | | |
|---|---|---|---|---|
| DE | 102008062107 | A1 * | 6/2010 | ............ B60L 11/182 |
| DE | 202010007613 | U1 * | 10/2010 | ............ B60L 11/182 |
| DE | 102009023409 | A1 * | 12/2010 | .......... B60L 11/1818 |
| DE | 102011108689 | * | 4/2012 | ............ B60L 11/182 |
| GB | 882906 | A * | 11/1961 | .............. B61L 25/04 |
| JP | EP 0823716 | A2 * | 2/1998 | .............. H01F 38/14 |
| JP | 2011139580 | A * | 7/2011 | |

OTHER PUBLICATIONS

The International Bureau of WIPO, The International Preliminary Report on Patentability for International Application No. PCT/EP2012/065371 mailed Feb. 27, 2014.

European Patent Office, International Search Report for International Application No. PCT/EP2012/065371, published as WO 2013/020956 A3, mailed Feb. 13, 2013.

German Patent Office, Search Report for Priority Application No. DE 10 2011 109 834.1, dated Jul. 17, 2012.

\* cited by examiner

METHOD AND CHARGING STATION FOR TRACTION BATTERY OF AN ELECTRIC VEHICLE WITH AUTOMATIC, MOTORIZED POSITIONING OF STATION-SIDE COUPLER TO INDUCTIVELY CHARGE THROUGH THE VEHICLE LICENSE PLATE

CROSS-REFERENCE TO RELATED APPLICATIONS

This application is a continuation-in-part of International Application No. PCT/EP2012/065371, published in German, with an International filing date of Aug. 6, 2012, which claims priority to DE 10 2011 109 834.1, filed Aug. 9, 2011; the disclosures of which are hereby incorporated in their entirety by reference herein.

TECHNICAL FIELD

The present invention relates to a charging station for inductively charging the traction battery of an electrically driven vehicle parked at the charging station, the charging station including a charging coupler having a charging station-side transformer part by which electrical energy can be transferred to a vehicle-side transformer part arranged behind the license plate of the vehicle when the charging coupler is moved to a position relative to the license plate at which the transformer parts sandwich the license plate, a motorized positioner configured to move the charging coupler in several spatial directions relative to the license plate of the vehicle, and a camera for monitoring the position of the charging coupler and the license plate relative to one another.

The present invention further relates to a method for inductively charging the traction battery of an electrically driven vehicle parked at such a charging station.

BACKGROUND

DE 20 2010 007 613 U1 describes a transmission system having a charging station of the type described above for the inductive charging of the traction battery of an electrically driven vehicle parked at the charging station. The transmission system includes a charging station-side transformer part and a vehicle-side transformer part. The charging station includes a charging coupler having the charging station-side transformer part. The vehicle-side transformer part is arranged on the vehicle behind the license plate of the vehicle. Electrical energy can be transferred from the charging station-side transformer part to the vehicle-side transformer part when the charging coupler is moved to a position relative to the license plate at which the transformer parts sandwich the license plate. The charging station further includes a motorized positioner configured to move the charging coupler in different spatial directions relative to the license plate. The charging station further includes a camera configured to detect the position of the charging coupler and the license plate relative to one another. The positioner is configured to use the camera information in order to precisely position the charging coupler with respect to the license plate and thereby position the transformer parts with respect to one another for optimal coupling.

Depending on how precisely the driver parks the vehicle relative to the charging coupler at the charging station prior to the process of the positioner positioning the charging coupler with respect to the license plate of the vehicle, the positioner has to be configured to move the charging coupler over a relatively large range of motion which makes the positioner relatively large and expensive.

SUMMARY

An object of the present invention includes a charging station of the type described above which enables precise positioning of the charging station-side and vehicle-side transformer parts with respect to one another, wherein the range of motion of the positioner for positioning the charging coupler having the charging station-side transformer part is considerably reduced.

In carrying out at least one of the above and other objects, the present invention provides a charging station for inductively charging the traction battery of an electrically driven vehicle. The charging station includes a charging coupler, a camera, a motorized positioner, and an approach controller. The charging coupler has a charging station-side transformer part by which electrical energy can be transferred to a vehicle-side transformer part arranged on the vehicle behind a license plate of the vehicle when the charging coupler is in a position relative to the license plate at which the transformer parts sandwich the license plate. The camera is configured to generate positional information indicative of positioning of the charging coupler and the license plate relative to one another. The positioner is configured to move the charging coupler within a range of motion. When the license plate is within the range of motion of the charging coupler the positioner is further configured to move the charging coupler based on the positional information to move the charging coupler to the position relative to the license plate at which the transformer parts sandwich the license plate. The approach controller is configured to generate driving instructions based on the positional information. The driving instructions are indicative on how to drive the vehicle to a position in which the license plate is within the range of motion of the charging coupler.

Further, in carrying out at least one of the above and other objects, the present invention provides a method for inductively charging the traction battery of an electrically driven vehicle at a charging station. The charging station includes a charging coupler and a motorized positioner configured to move the charging coupler within a range of motion. The charging coupler has a charging station-side transformer part by which electrical energy can be transferred to a vehicle-side transformer part arranged on the vehicle behind a license plate of the vehicle when the charging coupler is in a position relative to the license plate at which the transformer parts sandwich the license plate. The method includes generating positional information indicative of positioning of the charging coupler and the license plate relative to one another using a camera at the charging station. The method further includes generating driving instructions based on the positional information using an approach controller at the charging station, the driving instructions being indicative on how to drive the vehicle to a position in which the license plate is within the range of motion of the charging coupler. The method further includes driving the vehicle according to the driving instructions to drive the vehicle to the position in which the license plate is within the range of motion of the charging coupler. The method further includes, when the license plate is within the range of motion of the charging coupler, moving the charging coupler based on the positional information using the positioner to move the charging coupler to the position relative to the license plate at which the transformer parts sandwich the license plate.

In embodiments of the present invention, a charging station for inductively charging the traction battery of an electrically driven vehicle parked at the charging station includes a charging coupler, a positioner for moving the charging coupler in several spatial directions in a motorized manner, and a camera for recording positional data indicative of the position of the charging coupler and a license plate on the vehicle relative to one another. The charging coupler is attachable to the vehicle and includes a charging station-side transformer part. Electrical energy can be transferred from the charging station-side transformer part to a vehicle-side transformer part arranged behind the license plate of the vehicle when the charging coupler is in a position relative to the license plate at which the transformer parts sandwich the license plate. The positioner is configured to use the charging coupler positional data from the camera in order to move the charging coupler to the position at which the transformer parts sandwich the license plate.

The charging station further includes an approach controller in communication with the camera and the driver of the vehicle and/or the vehicle itself. The approach controller is configured to generate driving instructions to be used by the driver and/or the vehicle to move the vehicle to a position in which the license plate is adjacent to the charging station-side transformer part of the charging coupler. That is, the driving instructions are instructions or directions advising the driver (and/or the vehicle) on how to drive the vehicle to move the vehicle to the position in which the license plate is adjacent to the charging station-side transformer part. The approach controller generates the driving instructions based on the charging coupler positional data recorded by the camera. That is, the driving instructions are based on the position of the charging coupler and the license plate relative to one another. The approach controller is further configured to provide the driving instructions to the driver and/or the vehicle for the driver and/or the vehicle to use in order to park the vehicle at the position in which the license plate is adjacent to the charging station-side transformer part.

Subsequent to using the driving instructions to park the vehicle at the position in which the license plate is adjacent to the charging station-side transformer part, the positioner moves the charging coupler to the position at which the transformer parts sandwich the license plate. As a result of the coarse position adjustment due to the vehicle being parked relative to the charging coupler using the driving instructions, the positioner provides a fine tune movement adjustment of the charging coupler in order to move the charging coupler to the position at which the transformer parts sandwich the license plate. Consequently, the range of motion of the positioner for positioning the charging coupler may be relatively small.

The above features, and other features and advantages of the present invention are readily apparent from the following detailed description thereof when taken in connection with the accompanying drawings.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
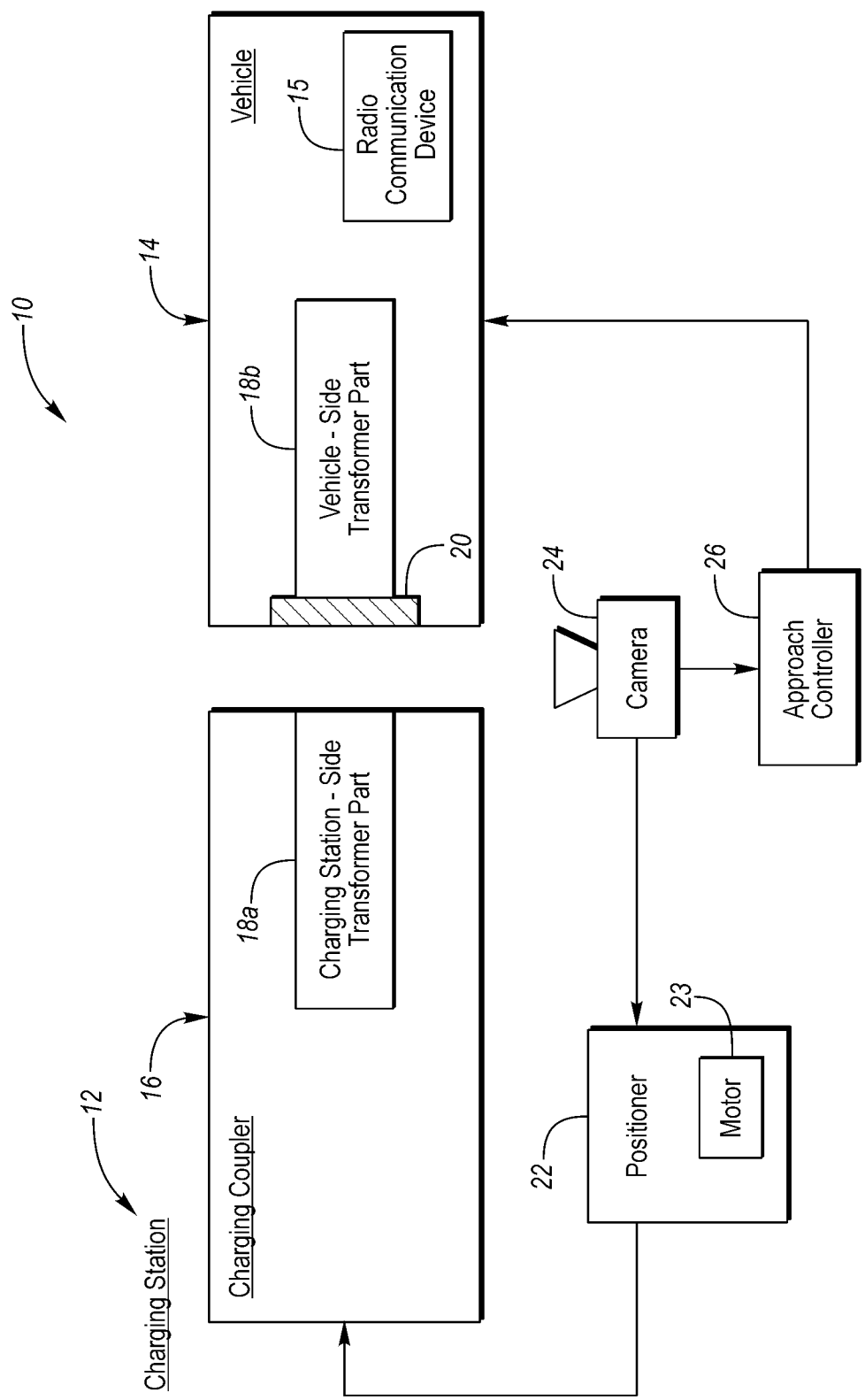
FIG. 1 illustrates a block diagram of a charging system having a charging station in accordance with an embodiment of the present invention.
Figure 2:
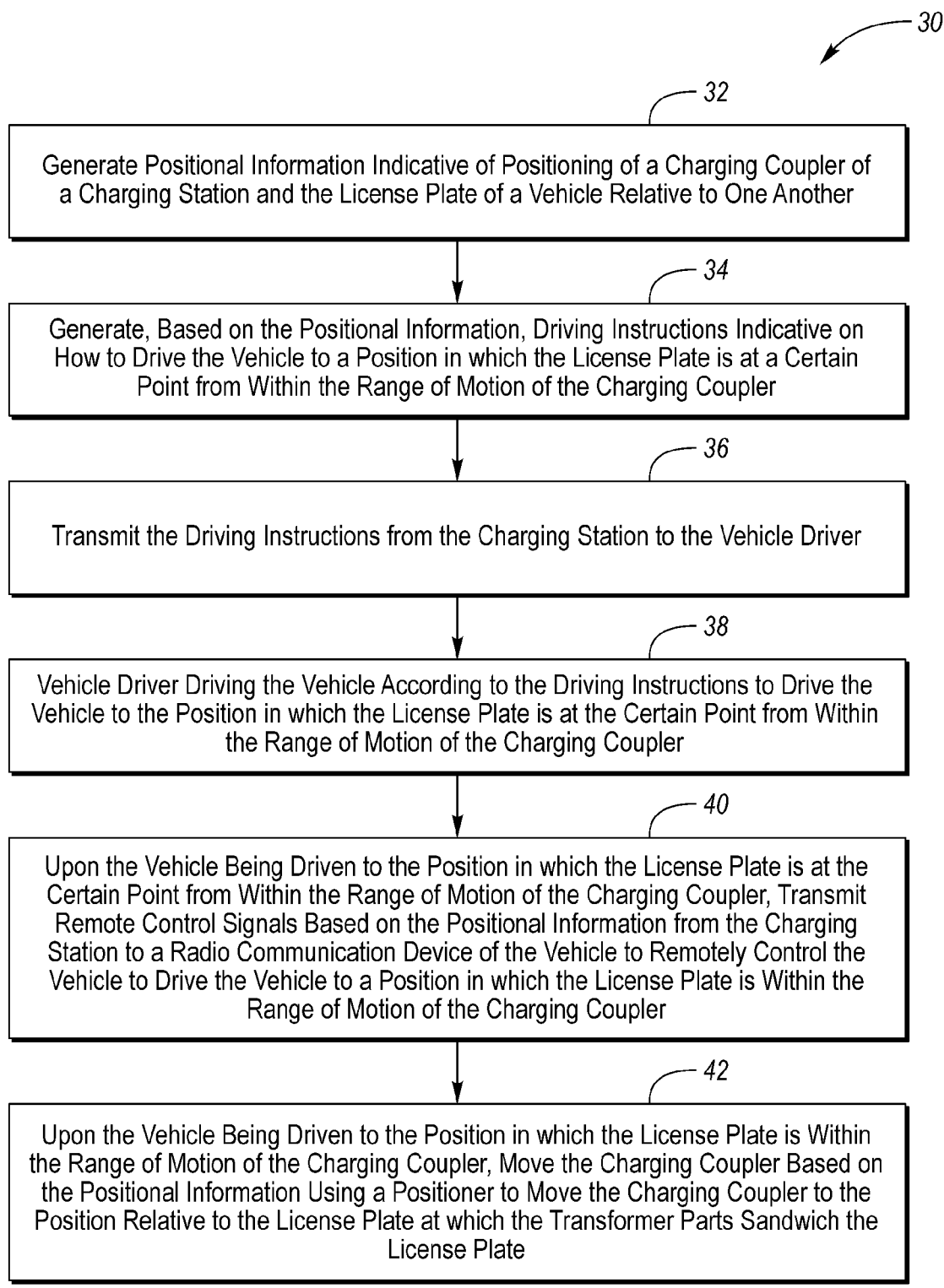
FIG. 2 illustrates a flowchart depicting operation of using the charging system in accordance with an embodiment of the present invention.

Referring now to FIGS. 1 and 2, a block diagram of a charging system 10 having a charging station 12 and a flowchart 30 depicting operation of using the charging system in accordance with an embodiment of the present invention are respectively shown. Charging station 12 is for inductively charging the traction battery of an electrically driven vehicle 14 parked at the charging station.

Charging station 12 includes a movable charging coupler 16 ("charger"). Charging coupler 16 is attachable to vehicle 14. Charging coupler 16 includes a charging station-side transformer part 18a at one end of the charging coupler. Vehicle 14 includes a vehicle-side transformer part 18b. Vehicle-side transformer part 18b is arranged behind a license plate 20 on vehicle 14. License plate 20 may be on the front or rear end of vehicle 20. Electrical energy can be transferred from charging station-side transformer part 18a to vehicle-side transformer part 18b when the charging coupler 16 is in a position relative to license plate 20 at which the transformer parts sandwich the license plate.

Charging station 12 further includes a positioner 22 configured to move charging coupler 16 in several spatial directions in a motorized manner via the use of a motor 23. Charging station 12 further includes a camera 24 for recording positional data indicative of the position of charging coupler 16 and license plate 20 relative to one another, as referenced in block 32 of flowchart 30. Positioner 22 is configured to use charging coupler positional data from camera 24 in order to move charging coupler 16 to the position at which transformer parts 18a, 18b sandwich license plate 20.

Charging station 12 further includes an approach controller 26 in communication with camera 24 and the driver of vehicle 14 and/or the vehicle itself (e.g., a communication device of the vehicle such as a radio communication device 15). Approach controller 26 is configured to generate driving instructions to be used by the driver and/or vehicle 14 to move the vehicle to a position at which license plate 20 is near or adjacent to charging station-side transformer part 18a, as referenced in block 34 of flowchart 30. Approach controller 26 generates the driving instructions based on the position of charging coupler 16 and license plate 20 relative to one another as detected by camera 24. Approach controller 26 is further configured to provide the driving instructions to the driver and/or vehicle 14 for the driver and/or the vehicle to use in order to park the vehicle at the position in which license plate 20 is adjacent to charging station-side transformer part 18a, as reference in block 36 of flowchart 30.

In operation of using charging station 12 to charge vehicle 14, the driver (and/or vehicle 14 by itself) initially drives the vehicle pursuant to the driving instructions from approach controller 26 to make a crude positional adjustment of the vehicle, particularly license plate 20, with respect to charging coupler 16, as referenced in block 38 of flowchart 30. Vehicle 14 is driven to make the crude positional adjustment until license plate 20 is within a range of motion of charging coupler 16 that is enabled by positioner 22. In turn, positioner 22 moves charging coupler 16 to perform a fine positional adjustment of the charging coupler with respect to license plate 20 and thereby move the charging coupler to the position at which transformer parts 18a, 18b sandwich license plate 20.

As such, subsequent to using the driving instructions from approach controller 26 to park vehicle 14 at a position in which license plate 20 is adjacent to charging station-side transformer part 18a, positioner 22 moves charging coupler 16 to move the charging coupler to the position at which transformer parts 18a, 18b sandwich license plate 20. As a result of the coarse position adjustment due to vehicle 14 being parked relative to charging coupler 16 using the driving instructions, positioner 22 may simply provide a fine tune movement adjustment of the charging coupler to move the charging coupler to the position at which transformer parts 18a, 18b sandwich license plate 20, as referenced in block 42 of flowchart 30. Consequently, the range of motion of positioner 22 for positioning charging coupler 16 may be relatively small due to the use initially moving vehicle 14 towards charging coupler 16 pursuant to the driving instructions.

As described, camera 24 at charging station 12 detects vehicle 14 being parked at the charging station and its (front) license plate 20 in particular. Within a specified neighborhood of vehicle 14, approach controller 26 provides driving instructions for properly approaching charging coupler 16 to the driver. For example, approach controller 26 can convey the driving instructions optically by illuminated arrows that indicate the direction of vehicle travel by suitable text indicators such as "right", "left", "forward", etc., or acoustically by appropriate voice commands. Camera 24 continuously monitors the desired approach of license plate 20 toward charging coupler 16, and approach controller 26 provides suitable driving instructions to the driver with the aid of the positional data of license plate 20 relative to charging coupler 16 recorded by camera 24.

Alternatively or additionally, approach controller 26 may actively assume steering control of vehicle 14 from a certain point without operator intervention, as referenced in block 40 of flowchart 30. In this case, the driver can, for example, be requested to confirm consent to transfer control of vehicle 14 to approach controller 26 by actuating a pushbutton or similar operation. Approach controller 26 then takes over control of vehicle 14, e.g., by remote control signals transmitted by a radio connection, and steers the vehicle continuously with the aid of positional data of license plate 20 from camera 24 to achieve an optimal approach of vehicle 14 (i.e., license plate 20) to charging station 12.

An approach of license plate 20 to charging coupler 16 to within a distance of about 10 to 30 cm can be achieved without difficulty in the framework of the approaches described herein. When one of the limiting distances falls within range, a further approach of vehicle 14 to charging station 12 is suppressed since approach controller 26 stops the vehicle remotely or provides the driver with an appropriate command. The remainder of the approach between transformer parts 18a, 18b is then assumed by a motor driven charging coupler 16 until optimal coupling between the transformer parts is achieved. Since this motion has to cover only a relatively small spatial region, it can be implemented with components that are relatively small and economical, but must still be executed sensitively and precisely. The steering and control for this motion also takes place with the aid of the positional data of license plate 20 that is continuously detected by camera 24. The motion of charging coupler 16 produced by the motor thereby occurs in three spatial directions (x-, y-, z-directions) and positions charging coupler 16 in the middle opposite license plate 20.

Charging coupler 16 is moved to lie alongside license plate 20 by another element lying opposite in the middle of charging coupler 16 and license plate 20. This results in pressures that are controlled by a force transducer of charging station 12 until a predetermined maximum force is achieved. The remaining inaccuracies, which can result from a non-precisely parallel alignment of the planes of charging coupler 16 and license plate 20, are compensated for by spring mounting charging coupler 16. An embodiment of charging coupler 16 as a collectively elastic, plate-shaped body enables an optimal coupling between transformer coils of transformer parts 18a, 18b, even for different shapes of license plate 20, such as in the case of a V-shaped bend. Since a relative motion in the lateral direction does not take place for elements already in contact between charging coupler 16 and license plate 20, scratching of license plate 20 is virtually excluded.

Additional information can also be recorded in the framework of the approach procedure of vehicle 14 to charging station 12 by using camera 24. Thus, on the one hand, the lettering on license plate 20 can be detected to identify vehicle 14 and thereby, for example, to verify authorization to charge at charging station 12, or if necessary, to facilitate an accounting procedure for using charging station 12. On the other hand, obstacles between vehicle 14 and charging station 12 and/or foreign bodies or dirt, which can hinder the approach of the vehicle to the charging station or at least the charging procedure itself, can be detected and appropriate warnings given to the driver to remove these obstacles.

While exemplary embodiments are described above, it is not intended that these embodiments describe all possible forms of the present invention. Rather, the words used in the specification are words of description rather than limitation, and it is understood that various changes may be made without departing from the spirit and scope of the invention. Additionally, the features of various implementing embodiments may be combined to form further embodiments of the present invention.

What is claimed is:

1. A charging station for inductively charging the traction battery of an electrically driven vehicle, the charging station comprising:
   a charging coupler having a charging station-side transformer part by which electrical energy can be transferred to a vehicle-side transformer part arranged on the vehicle behind a license plate of the vehicle when the charging coupler is in a position relative to the license plate at which the transformer parts sandwich the license plate;
   a camera configured to generate positional information indicative of positioning of the charging coupler and the license plate relative to one another;
   a motorized positioner configured to move the charging coupler within a range of motion, wherein when the license plate is within the range of motion of the charging coupler the positioner is further configured to move the charging coupler based on the positional information to move the charging coupler to the position relative to the license plate at which the transformer parts sandwich the license plate; and
   an approach controller configured to generate driving instructions based on the positional information, the driving instructions being indicative on how to drive the vehicle to a position in which the license plate is at a certain point from within the range of motion of the charging coupler;
   the approach controller is further configured to transmit the driving instructions to a driver of the vehicle for the driver to use to drive the vehicle to the position in which the license plate is at the certain point from within the range of motion of the charging coupler;

the approach controller is further configured to, upon the vehicle being driven to the position in which the license plate is at the certain point from within the range of motion of the charging coupler, transmit remote control signals based on the positional information via a radio connection to the vehicle to remotely control the vehicle without driver intervention to drive the vehicle to a position in which the license plate is within the range of motion of the charging coupler and, upon the vehicle being driven to the position in which the license plate is within the range of motion of the charging coupler, to remotely control the vehicle without driver intervention to stop the vehicle and suppress a further approach of the vehicle towards the charging coupler.

2. The charging station of claim 1 wherein:
the approach controller is further configured to transmit the driving instructions to the driver via at least one of acoustic and optical delivery mechanisms.

3. The charging station of claim 1 wherein:
the camera is further configured to record the license plate as the license plate is moved towards the charging coupler.

4. A method for inductively charging the traction battery of an electrically driven vehicle at a charging station, the charging station including a charging coupler and a motorized positioner configured to move the charging coupler within a range of motion, the charging coupler having a charging station-side transformer part by which electrical energy can be transferred to a vehicle-side transformer part arranged on the vehicle behind a license plate of the vehicle when the charging coupler is in a position relative to the license plate at which the transformer parts sandwich the license plate, the method comprising:

generating positional information indicative of positioning of the charging coupler and the license plate relative to one another using a camera at the charging station;

generating driving instructions based on the positional information using an approach controller at the charging station, the driving instructions being indicative on how to drive the vehicle to a position in which the license plate is at a certain point from within the range of motion of the charging coupler;

transmitting the driving instructions from the approach controller to a driver of the vehicle;

driving, by the driver, the vehicle according to the driving instructions to drive the vehicle to the position in which the license plate is at the certain point from within the range of motion of the charging coupler;

upon the vehicle being driven to the position in which the license plate is at the certain point from within the range of motion of the charging coupler, transmitting remote control signals based on the positional information from the approach controller via a radio connection to the vehicle to remotely control the vehicle without driver intervention to drive the vehicle to a position in which the license plate is within the range of motion of the charging coupler and, upon the vehicle being driven to the position in which the license plate is within the range of motion of the charging coupler, to remotely control the vehicle without driver intervention to stop the vehicle and suppress a further approach of the vehicle towards the charging station; and upon the vehicle being driven to the position in which the license plate is within the range of motion of the charging coupler, moving the charging coupler based on the positional information using the positioner to move the charging coupler to the position relative to the license plate at which the transformer parts sandwich the license plate.

5. The method of claim 4 wherein:
transmitting the driving instructions from the approach controller to a driver of the vehicle is via at least one of acoustic and optical delivery mechanisms.

6. A charging system for inductively charging the traction battery of an electrically driven vehicle, the charging system comprising:

a charging coupler;

a transformer assembly having a charging station-side transformer part and a vehicle-side transformer part, the charging station-side transformer part being part of the charging coupler, the vehicle-side transformer part being part of the vehicle and arranged behind a license plate of the vehicle, wherein electrical energy can be transferred from the charging station-side transformer part to the vehicle-side transformer part when the charging coupler is in a position relative to the license plate at which the transformer parts sandwich the license plate;

a camera configured to generate positional information indicative of positioning of the charging coupler and the license plate relative to one another;

a motorized positioner configured to move the charging coupler within a range of motion;

an approach controller configured to generate driving instructions based on the positional information, the driving instructions being indicative on how to drive the vehicle to a position in which the license plate is at a certain point from within the range of motion of the charging coupler;

the approach controller is further configured to transmit the driving instructions to a driver of the vehicle for the driver to use to drive the vehicle to the position in which the license plate is at the certain point from within the range of motion of the charging coupler;

wherein when the license plate is at the certain point from within the range of motion of the charging coupler, the approach controller is further configured to transmit remote control signals based on the positional information via a radio connection to the vehicle to remotely control the vehicle without driver intervention to drive the vehicle to a position in which the license plate is within the range of motion of the charging coupler and, upon the vehicle being driven to the position in which the license plate is within the range of motion of the charging coupler, to remotely control the vehicle without driver intervention to stop the vehicle and suppress a further approach of the vehicle towards the charging coupler; and wherein when the license plate is within the range of motion of the charging coupler the positioner is further configured to move the charging coupler based on the positional information to move the charging coupler to the position relative to the license plate at which the transformer parts sandwich the license plate.

7. The charging system of claim 6 wherein:
the approach controller is further configured to transmit the driving instructions to the driver via at least one of acoustic and optical delivery mechanisms.

8. The charging system of claim 6 wherein:
the camera is further configured to record the license plate as the license plate is moved towards the charging coupler.

* * * * *